US010841355B2

(12) United States Patent
Sengoku et al.

(10) Patent No.: US 10,841,355 B2
(45) Date of Patent: Nov. 17, 2020

(54) METHODS AND APPARATUS FOR STREAMING MEDIA CONVERSION WITH REDUCED BUFFERING MEMORIES

(71) Applicant: Apple Inc., Cupertino, CA (US)

(72) Inventors: Shoichiro Sengoku, Dublin, CA (US); Anup K. Sharma, Sunnyvale, CA (US); Andrew Kenneth John McMahon, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 16/230,930

(22) Filed: Dec. 21, 2018

(65) Prior Publication Data

US 2020/0021633 A1    Jan. 16, 2020

Related U.S. Application Data

(60) Provisional application No. 62/697,945, filed on Jul. 13, 2018.

(51) Int. Cl.
*H04L 29/06* (2006.01)
*G06F 13/42* (2006.01)
*G06F 13/16* (2006.01)

(52) U.S. Cl.
CPC ........ *H04L 65/605* (2013.01); *G06F 13/1673* (2013.01); *G06F 13/4291* (2013.01)

(58) Field of Classification Search
None
See application file for complete search history.

(56) References Cited

U.S. PATENT DOCUMENTS

| | | | | |
|---|---|---|---|---|
| 5,222,101 A * | 6/1993 | Ariyavisitakul | ....... | H04B 7/005 375/231 |
| 5,450,413 A * | 9/1995 | Hazama | ................ | H04J 3/0682 370/252 |
| 6,115,395 A * | 9/2000 | Norrell | .................... | H04J 3/125 370/250 |
| 7,088,741 B2 * | 8/2006 | Kobayashi | ................ | G06F 3/14 348/473 |
| 2003/0112372 A1 * | 6/2003 | Weaver | .................... | H04N 9/44 348/555 |
| 2004/0012612 A1 * | 1/2004 | Chan | ....................... | G09G 5/006 345/619 |

(Continued)

*Primary Examiner* — Davoud A Zand
(74) *Attorney, Agent, or Firm* — Gazdzinski & Associates, PC

(57) ABSTRACT

Methods and apparatus for converting streaming media between different formats. A bridging device for e.g., Camera Serial Interface (CSI) and DisplayPort is disclosed. Both the CSI and DisplayPort technologies use low power mode operation during blanking intervals of a video transmission. However, the CSI interface can wake up in a very short amount of time (e.g., ~400 ns), but the DisplayPort interface takes significantly longer to perform link training (e.g., ~1 ms). Various embodiments of the present disclosure use frame signaling trigger to start a wait time interval timer; the wait time interval can be used by the bridge device to wake up the DisplayPort interface ahead of the CSI2 D-PHY interface, thereby ensuring that both links are active at the same time. This "wake-up" technique can greatly reduce the size of buffering memories that are required.

20 Claims, 7 Drawing Sheets

(56) References Cited

U.S. PATENT DOCUMENTS

| | | | | |
|---|---|---|---|---|
| 2012/0317607 A1* | 12/2012 | Wyatt | ................... | G09G 5/006 725/127 |
| 2014/0112339 A1* | 4/2014 | Safranek | ............ | G06F 13/4022 370/389 |
| 2015/0070364 A1* | 3/2015 | Anantharaman | ...... | G09G 5/006 345/505 |
| 2016/0378421 A1* | 12/2016 | Radhakrishnan | ..... | G06F 1/1641 345/1.3 |

* cited by examiner

METHODS AND APPARATUS FOR STREAMING MEDIA CONVERSION WITH REDUCED BUFFERING MEMORIES

PRIORITY

This application claims the benefit of priority to U.S. Provisional Patent Application Ser. No. 62/697,945 filed Jul. 13, 2018 and entitled "METHODS AND APPARATUS FOR STREAMING MEDIA CONVERSION WITH REDUCED BUFFERING MEMORIES", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronic devices, as well as networks thereof. More particularly, the disclosure is directed to methods and apparatus for converting streaming media between various formats. Various aspects of the present disclosure are directed to, in one exemplary aspect, converting streaming media within reduced buffering memory.

2. DESCRIPTION OF RELATED TECHNOLOGY

The presentation of audio and visual elements has a direct impact on customer satisfaction. For example, many multimedia devices are widely judged (and purchased) according to qualities such as display quality, sound fidelity, smooth rendering, crispness of the display, lack of motion artifact or "jerkiness", etc. Other areas of multimedia applications which may affect consumers include interoperation (e.g., with other equipment, legacy standards, etc.), ease of use, cost, power consumption.

DisplayPort™ (developed by the Assignee hereof) is one example of a display interface technology that is commonly used among consumer electronics. It is specified by the Video Electronics Standards Association (VESA). DisplayPort enables networking of many different digital audio/visual (A/V) devices within a variety of network configurations and/or functionalities. Additionally, DisplayPort is designed for a wide variety of performance requirements, and broadly supports inter alia, PCs, monitors, panels, projectors, and high definition (HD) content applications.

Another such commonly used format is the Camera Serial Interface 2 (CSI2) format promulgated by the Mobile Industry Processor Interface (MIPI) Alliance and used in many mobile devices (e.g., cellular phones, etc.) MIPI CSI2 is a protocol layer specification which is implemented in conjunction with a physical layer specification. The MIPI Alliance specifies three interchangeable physical layers: MIPI D-PHY, MIPI M-PHY and MIPI C-PHY. Different physical layer implementations support different applications for smartphones and mobile-connected devices such as tablets, laptops, automobiles, robotics systems, wearables and other endpoints (e.g., the Internet of Things (IoT)). MIPI D-PHY is used primarily to interconnect cameras and displays to an application processor. MIPI M-PHY supports multimedia and chip-to-chip/inter-processor communications. MIPI C-PHY supports cameras and displays.

Consumers may own an ecosystem of media devices which have different native formats. For example, even though DisplayPort devices do not natively support MIPI CSI2 formats and vice versa, a mixed network of devices can be supported with the use of internal and/or external "bridge" converters. Unfortunately, certain types of media may present challenges for bridge converters and/or suffer from undesirable effects during conversion. For example, streaming video content may suffer from lag or jerkiness due to the large amount of buffering that is required to convert a video frame (in its entirety) from one format to another. In another such example, streaming video content may interfere with power saving and/or "link training" functionality which is typically performed during idle bus states (e.g., during blanking periods between video frames.) Link training is the process by which the transmitter and receiver tune their equalization settings and other physical parameters to achieve a desired bit error rate (BER) during high-speed serial bus operation.

To these ends, solutions are needed for converting streaming media between various formats seamlessly. More generally, improved methods and apparatus for converting streaming media within reduced buffering memory are desired.

SUMMARY

The present disclosure satisfies the foregoing needs by providing, inter alia, methods and apparatus for converting streaming media within reduced buffering memory.

In one aspect, a method for converting streaming media between different formats is disclosed. In one embodiment, the method includes: determining a wait interval; responsive to detecting a frame timing signal, starting a timer for the wait interval; initiating link training after the timer has expired; and transferring content.

In one variant, the wait interval is determined based on a time difference between a first video frame and an immediate predecessor video frame.

In another variant, the wait interval is determined based on a time difference between a first video start frame signal and a second video start frame signal.

In another variant, the wait interval is determined based on a time difference between a first video start frame signal and a second video end frame signal.

In one exemplary variant, the wait interval is determined based on one or more parameters associated with a video frame configuration. In one such variant, the one or more parameters includes a frame rate. In another such variant, the one or more parameters includes a vertical blanking interval time.

In still other variants, transferring the content further includes: receiving a first data stream into a memory buffer; converting the first data stream into a second data stream; and transmitting the second data stream.

In another aspect, a bridge apparatus is disclosed. In one embodiment, the bridge apparatus includes: a first interface configured to receive a first data stream having a first data format; and a second interface configured to transmit a second data stream having a second data format different than the first data format; wherein the first interface has a first initialization time and the second interface has a second initialization time. In one exemplary embodiment, the bridge apparatus includes: a processing logic including a conversion logic and a timing logic: the conversion logic configured to convert the first data stream having the first data format into the second data stream having the second data format; and the timing logic configured to initialize the first interface or the second interface based on a difference between the first initialization time and the second initialization time.

In one variant, the first interface is a Camera Serial Interface (CSI)-compliant interface and the second interface is a DisplayPort-compliant interface.

In another variant, the first interface is configured to receive an external clock signal; and the second interface includes a clock recovery circuit. In one such variant, the first initialization time is based on a settling time associated with the external clock signal. In another such variant, the second initialization time is based on a clock recovery time and a symbol lock time associated with the clock recovery circuit.

In one variant the bridge apparatus includes a memory buffer configured to store an amount of data; and the amount of data is based on a first data rate of the first data stream and the difference between the first initialization time and the second initialization time. In one such variant, the timing logic is further configured to calculate the amount of data based on a frame configuration parameter.

In one variant, the timing logic is further configured to measure a time that elapses between periodic frame timing signals; and the bridge apparatus further includes a memory buffer configured to store an amount of data based on the time. In one such variant, the timing logic measures the time that elapses between periodic frame timing signals in response to a frame configuration. In another such variant, the timing logic measures the time that elapses between periodic frame timing signals in response to an initial power-up process.

In one aspect, a consumer device is disclosed. In one embodiment, the consumer device includes: a memory component configured to store data; an internal bridge logic configured to receive a first data stream having a first data format and generate a second data stream having a second data format different than the first data format; wherein the internal bridge logic consumes an amount of memory of the memory component based on a buffering time; and a timing logic configured to adjust the amount of memory consumed. In one exemplary variant, the consumer device further includes: a camera component configured to generate the first data stream according to a Camera Serial Interface 2 (CSI2) data format; and an audio visual component configured to receive the second data stream according to a DisplayPort data format.

In another aspect, a computerized device implementing one or more of the foregoing aspects is disclosed and described. In one embodiment, the device includes a personal or laptop computer. In another embodiment, the device includes a mobile device (e.g., tablet or smartphone).

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed.

In another aspect, a computer readable storage apparatus storing instructions that implement one or more of the foregoing aspects is disclosed and described. In one embodiment, the computer readable apparatus includes a program memory, or an EEPROM. In another embodiment, the apparatus includes a solid state drive (SSD) or other mass storage device.

Other features and advantages of the present disclosure will immediately be recognized by persons of ordinary skill in the art with reference to the attached drawings and detailed description of exemplary embodiments as given below.

All figures © Copyright 2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present invention are now described in detail. While these embodiments are primarily discussed in the context of the Video Electronics Standards Association (VESA) DisplayPort (DP) and Mobile Industry Processor Interface (MIPI) Alliance Camera Serial Interface 2 (CSI2) audio/visual (A/V) bus protocol family of standards, it will be recognized by those of ordinary skill when given this disclosure that the present invention is not so limited. In fact, the various aspects of the invention are useful in literally any A/V bus protocol that can benefit from the various modifications and improvements described herein.

Additionally, the present invention is useful in any number of different types of devices including without limitation computers (desktops, towers, laptops, etc.), hand-held devices such as smart phones and MP3 players, digital readers or tablets, and navigation systems (hand-held and in-vehicle). For instance, exemplary consumer electronics products manufactured by the Assignee hereof that may benefit from one or more aspects of the invention include but are not limited to, the iPhone™, iPod™, iPad™, Macbook™, Macbook Pro™ Macbook Air™, etc.

Exemplary Media Formats—

Figure 1:
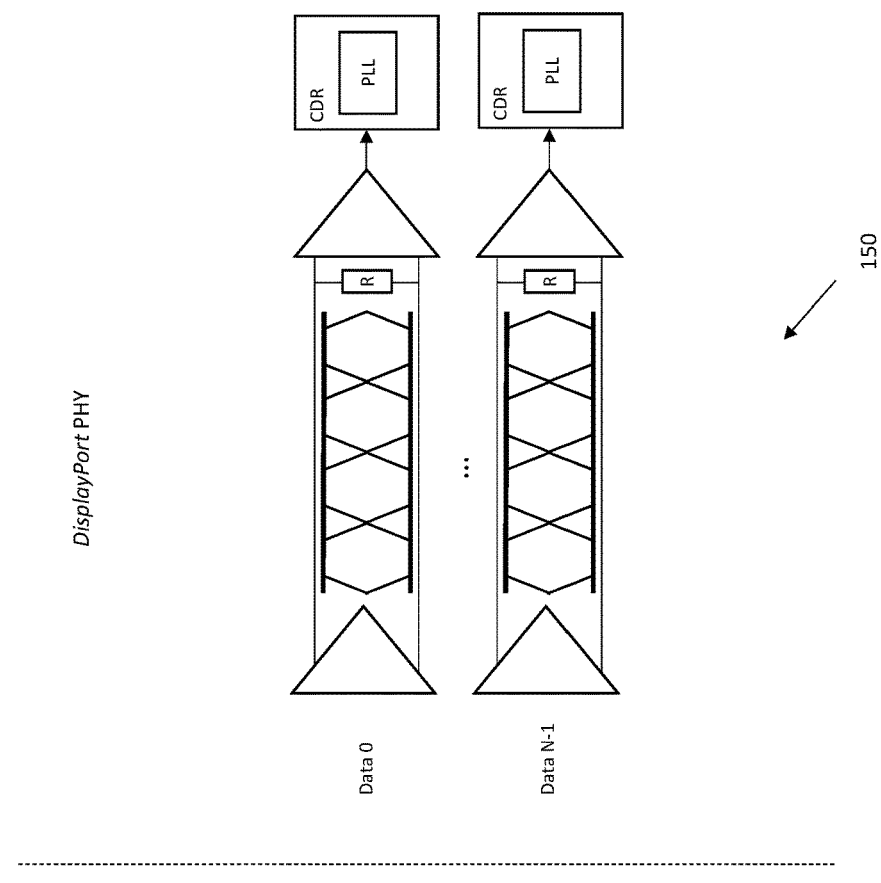
FIG. 1 is a graphical side-by-side comparison of two physical (PHY) layer interfaces, useful for explaining various principles described herein.
Figure 1:
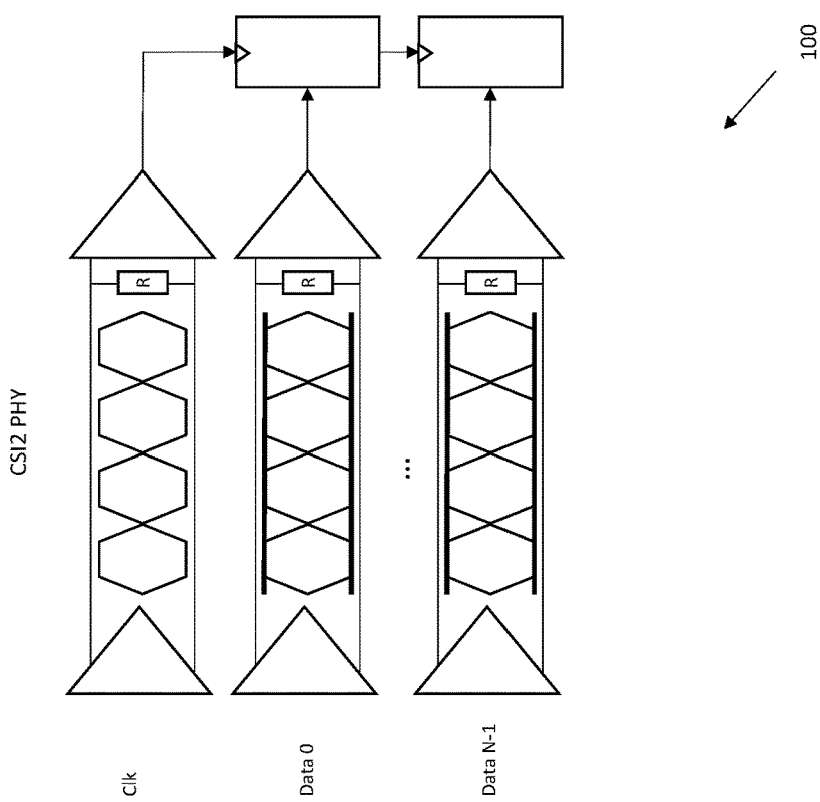

FIG. 1 is a graphical representation of a side-by-side comparison of the physical (PHY) layer interface for Camera Serial Interface 2 (CSI2) 100 and DisplayPort 150.

As shown therein, the CSI2 interface 100 includes a differential clock signal and one or more differential data lanes. During operation, data transmitted over the data lanes is captured via registers that are explicitly clocked with the differential clock signaling. Since data is provided with a clock, the receiver of a CSI2 data has a clock reference of the transmitter.

In contrast, the DisplayPort interface 150 includes one or more differential data lanes that transmit data without an explicit clock signal. The DisplayPort receiver must recover an "embedded" or "implicit" clock signal from the data using a clock data recovery (CDR) circuit. During operation, the receiver generates a clock from an approximate frequency reference, and then phase-aligns the clock to the transitions in the data stream with a phase-locked loop (PLL). Generally, CDR data streams require a sufficient number of data transitions so as to enable phase alignment with the PLL generated clock. Other common techniques for CDR may use delay-locked loops and/or oversampling of the data stream.

As a brief aside, DisplayPort data uses 8B10B encoding that maps an 8-bit data byte or one of a set of twelve (12) control symbols to a 10-bit symbol in order to achieve "DC-balance." The mapping of eight (8) bit data and control bytes to ten (10) bit signals is such that the mapped versions of the control symbols and data symbols have a high number of edge transitions. Specifically, any sequence of 8B10B symbols cannot have more than a disparity of +1 or −1 when counting the number of ones and zeros (at symbol boundaries). For example, if after a number of 10-bit symbols the running disparity is −1, then the next symbol will either have exactly five (5) ones and five (5) zeros (i.e., the running disparity remains −1), or it will have six (6) ones and four (4) zeros (i.e., the running disparity changes to +1).

Figure 2:
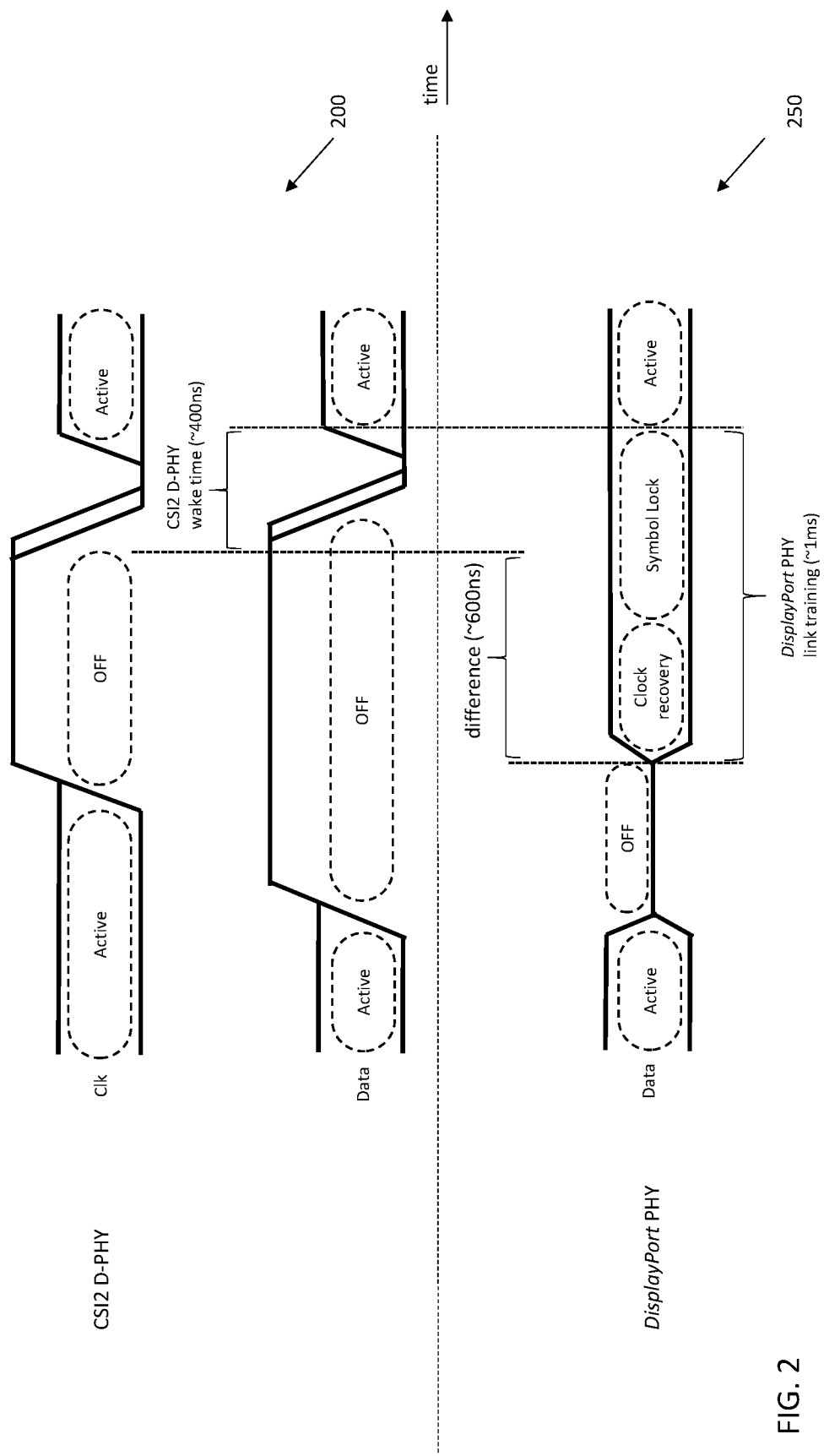
FIG. 2 is a graphical timing comparison of the physical (PHY) layer interfaces of FIG. 1, useful for explaining various principles described herein.

FIG. 2 is a graphical representation of a timing comparison of the D-PHY interface for Camera Serial Interface 2 (CSI2) 200 and DisplayPort 250. As a brief aside, many data types have periods of activity and inactivity. For example, an audio/visual (AV) data stream may include several types of data: (1) video data for image pixels of an active video line, (2) data island data that may include audio and/or auxiliary data, (3) control data, and (4) blanking data (which may be further sub-divided into vertical and horizontal blanking data). The transmitter and/or receiver are active during video, data island and/or control data periods, however blanking periods are devoid of AV activity. In some cases, during inactive periods the device may enter a low power mode. In other cases, inactive periods may be used to transmit out-of-band data or otherwise repurposed for non-media activity. While the instant disclosure is presented within the context of AV data; artisans of ordinary skill will readily appreciate that techniques for shutting down data bus activity during inactive periods are widely used in a variety of different contexts (general compute, wireless transmissions, enterprise service, and/or any number of other data transmission technologies.)

As previously noted, the CSI2 D-PHY interface 200 explicitly clocks data (200 mV differential signaling) during active periods. When data is inactive, the CSI2 D-PHY interface can revert to a low power mode to save power (CSI2 D-PHY drifts to a 1.2V single-ended mode during inactivity). Prior to the next data transaction, the clocking components "wake up." Existing implementations of CSI2 D-PHY wake up within 400 nanoseconds (ns), allowing sufficient time for the clock to settle before data is active.

The DisplayPort interface 250 uses a similar scheme to save power. During inactive periods the DisplayPort interface 250 reverts to a low power mode to save power (DisplayPort drifts to a high impedance state). However, in order to wake up in time to receive the next block of data, the DisplayPort interface performs link training in order to re-lock PLLs.

Since DisplayPort uses a clock data recovery (CDR) rather than explicit clock signaling, DisplayPort must align the transmitter and receiver time references during the link training process. Specifically, both transmitter and receiver perform a clock recovery to establish a common PLL clock frequency. Once both the transmitter and the receiver have aligned PLL clock frequencies, they perform symbol lock to time align on 8B10B symbol boundaries. While the illustrated embodiment shows two (2) distinct stages for link training (e.g., a clock recovery stage and a symbol lock stage), artisans of ordinary skill in the related arts will readily appreciate the variety of other schemes which may be substituted with equivalent success given the contents of the present disclosure. For example, other techniques may use a greater or fewer number of stages and/or other components (e.g., DLLs). Existing link training techniques for DisplayPort take over one (1) millisecond (ms).

As shown in FIG. 2, even though both CSI2 D-PHY and DisplayPort use low power modes to reduce overall power consumption, the time difference between CSI2 D-PHY wake up and DisplayPort link training can be significant (e.g., over 600 ns). When used in homogenous networks of similar devices, these design differences generally yield different benefits that are tailored for specific applications. For example, CSI2 D-PHY enables very low power operation for power constrained contexts such as mobile devices. In contrast, DisplayPort's link training times are offset by much higher data rates for performance driven contexts.

Figure 3:
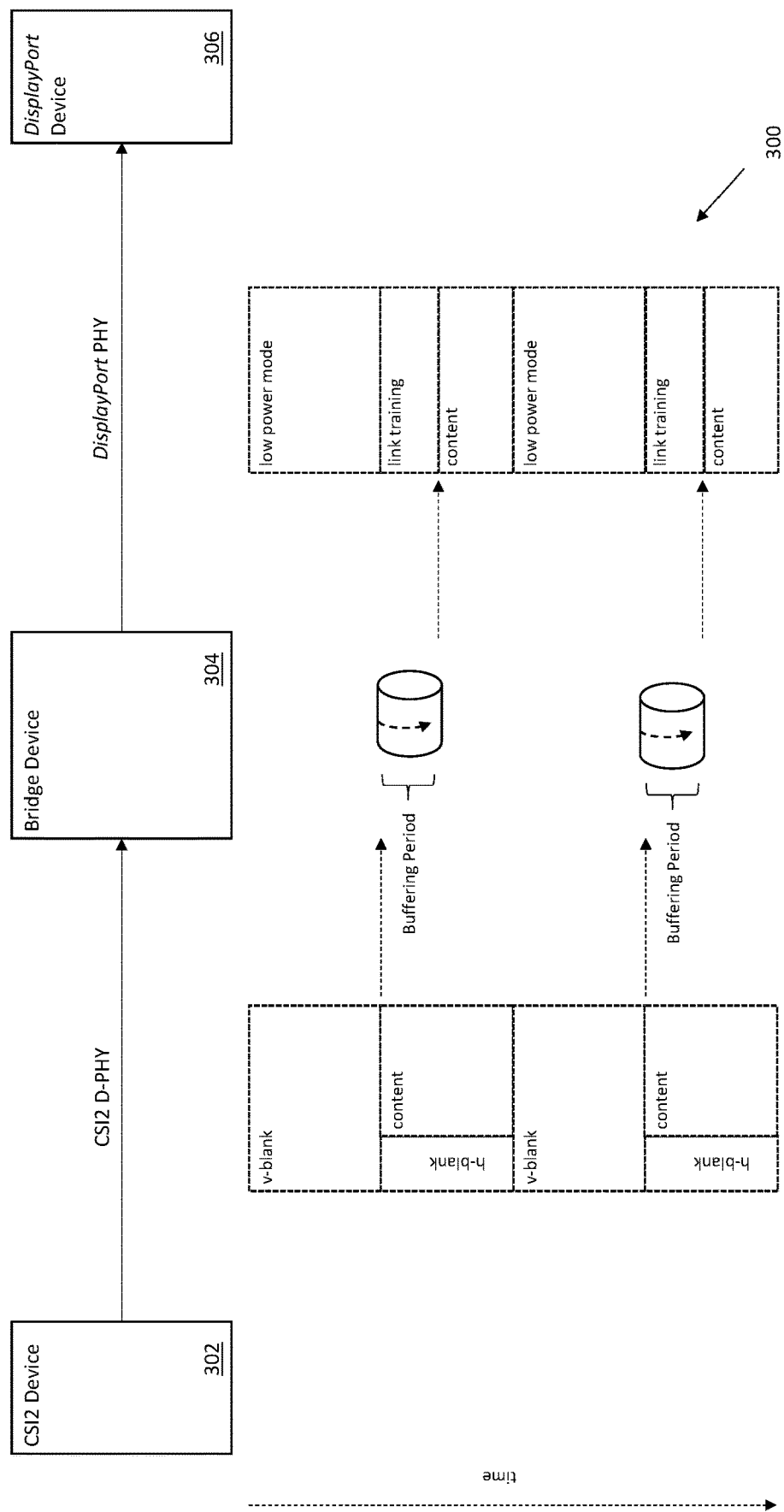
FIG. 3 is a graphical representation of an existing bridge network, useful for explaining various aspects of bridging streaming media.

Unfortunately, these differences in operation can detract from overall performance in heterogeneous networks of devices. FIG. 3 is a graphical representation of an existing bridge network 300 useful to illustrate such deficiencies. As shown therein, a CSI2 D-PHY device 302 provides a CSI2 D-PHY data stream to a bridge device 304; the bridge device 304 converts the CSI2 D-PHY data stream into a DisplayPort data stream for consumption by a DisplayPort device 306.

Both the CSI2 D-PHY and DisplayPort links transition to an inactive mode during the vertical blanking intervals. Similarly, both CSI2 D-PHY and DisplayPort links transition to active modes during content transmission. However, while the CSI2 D-PHY interface can wake up in a very short amount of time (e.g., ~400 ns), the DisplayPort interface takes significantly longer to perform link training (e.g., ~1 ms). During this time, the bridge device 304 buffers the data stream until the DisplayPort link is properly initialized. Once the DisplayPort link is active, the bridge device 304 can spool the buffered data to the DisplayPort device 306.

While the bridge device 304 enables interoperability between DisplayPort and CSI2 D-PHY devices, the large memory requirements for buffering the data stream during link training is undesirable. More directly, methods and apparatus for converting streaming media within reduced buffering memory are needed.

Exemplary Apparatus—

Figure 4:
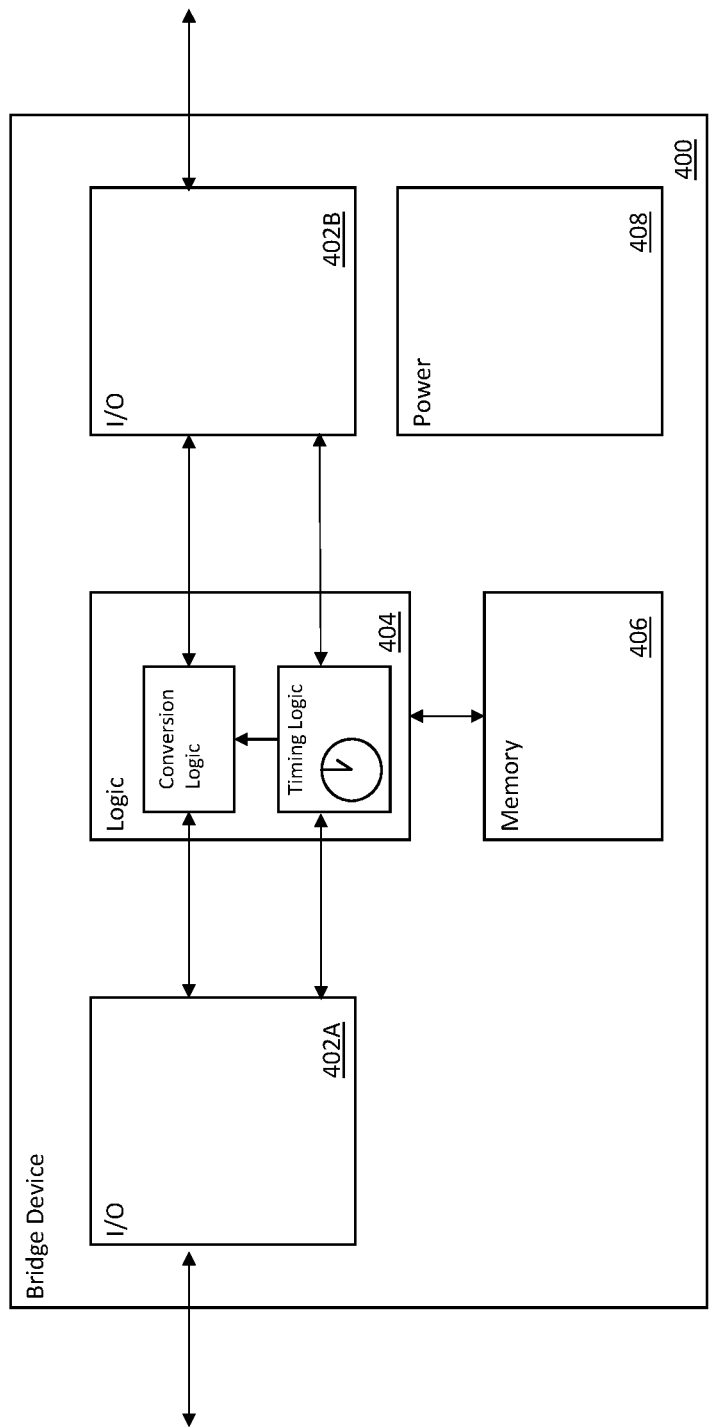
FIG. 4 is a logical block diagram of one exemplary bridge device, in accordance with the various principles described herein.

FIG. 4 is a logical block diagram of one exemplary bridge device 400 in accordance with the various principles described herein. As used herein, the term "bridge device"

includes, but is not limited to devices used to bridge between two or more data formats. Such bridge devices may be external to other devices such as cellular telephones, smartphones (such as for example an iPhone™), personal computers (PCs), such as for example an iMac™, Mac Pro™, Mac Mini™, MacBook™, MacBook Pro™, MacBook Air™, and minicomputers, whether desktop, laptop, or otherwise, as well as mobile devices such as handheld computers, PDAs, video cameras, set-top boxes, personal media devices (PMDs), such as for example an iPad™, display devices (e.g., those compliant with the aforementioned DisplayPort standard(s)), or any combinations of the foregoing. In other embodiments, the bridge device may be incorporated as part of one of the foregoing devices. While a specific device configuration and layout is shown and discussed, it is recognized that many other implementations may be readily implemented by one of ordinary skill given the present disclosure, the apparatus 400 of FIG. 4 being merely illustrative of the broader principles of the invention.

The exemplary bridge device 400 includes one or more input/output (I/O) interfaces 402, logic 404, a memory 406, and a power management unit 408. In one exemplary embodiment, the logic 404 further includes conversion logic to convert data between different formats, and a timing logic. Various other embodiments may implement greater or lesser functionality and/or subdivide and/or group such functionality differently. For example, some implementations may additionally incorporate various power control logic and/or access control logic. In still another example, conversion logic may be separated from the timing logic.

In one exemplary embodiment, the logic 404 is implemented within a field programmable gate array (FPGA). In other embodiments, the logic 404 may be implemented within a processor or other form of logic (e.g., application specific integrated circuit (ASIC), etc.) Still other bridging devices may incorporate any number of processing or logic cores. For example, some bridging devices may include multiple FPGAs, etc.

In one exemplary embodiment, the bridge device 400 includes a first I/O interface 402A configured to connect to a CSI2 D-PHY device and a second I/O interface 402B configured to connect to a DisplayPort device. As used herein, the term "interface" typically refers to any signal, data, format, or software interface with a component, network or process. Common examples of interface technologies include, without limitation, those of the MIPI CSI (e.g., CSI2 C-PHY, CSI2 D-PHY, etc.), PCIe, IEEE 1394b, CoaXPress, USB (e.g., USB2.0, USB3.0, etc.). Certain interface technologies may implement an embedded clock and use a wake-up period to recover clock and data; these may include e.g., CSI-3, UniPro, M-PHY. Various other interface technologies may be substituted by artisans of ordinary skill in the related arts, given the contents of the present disclosure.

In some variants, the I/O interface 402 may be dynamically configurable. For example, the bridge device 400 may include programmable logic that can support a variety of different logic (e.g., 8B10B, TMDS, etc.), different voltages (e.g., 1.8V, 3.3V, 5V), different signaling modes (LVDS, sub-LVDS, D-PHY, CMOS), signaling frequencies, and/or any number of other physical parameters.

In one exemplary embodiment, the bridge device 400 includes logic 404 implemented within e.g., look up tables (LUTs), standard logic cell, slices, processing cores, and various forms of memory (block RAM, distributed RAM, etc.). In alternative embodiments, the bridge device 400 may include a processing subsystem, central processing units (CPU), digital processors, or other processing logic such as a microprocessor, digital signal processor, or plurality of processing components mounted on one or more substrates.

In one exemplary embodiment, the bridge device 400 includes logic 404 or other processing that is coupled to operational memory 406, which may include for example SRAM, FLASH and SDRAM components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

In one exemplary embodiment, the logic 404 is adapted to receive one or more data streams from a first I/O interface 402A characterized by a first data format. The logic 404 extracts data and/or control information for storage within the operational memory 406. In one exemplary embodiment, the data and/or control information includes an audio/visual (AV) data stream including several types of data: (1) video data, (2) data island data, (3) control data, and (4) blanking data (which may be further sub-divided into vertical and horizontal blanking data). For example, the logic 404 receives an AV data stream in a CSI2 D-PHY data format, extracts, and stores the corresponding video data, data island data, control data, and/or blanking information.

In one exemplary embodiment, the logic 404 is adapted to transmit one or more data streams via a second I/O interface 402B characterized by a second data format. The logic 404 retrieves data and/or control information from storage within the operational memory 406. In one exemplary embodiment, the logic 404 transmits an AV data stream in a DisplayPort data format.

While the present embodiment is directed to AV data streams, artisans of ordinary skill in the related arts will readily appreciate that bridge devices are commonly used in a plethora of applications which move from one data format to another data format. Common examples of bridging circuits include e.g., media bridges, network bridges, security domain bridges, etc. Common examples of media bridges include without limitation: IEEE 802.1BA (audio video bridging systems), IEEE 802.1AS (time synchronization for time sensitive applications, IEEE 802.1Q (media access control bridges and virtual bridged local area networks), etc. Network bridging is well known in the related arts and commonly enables multiple different network segments to be aggregated within a common network. Similarly, security domain bridging is commonly used to preserve e.g., different security protections and/or digital rights management schemes.

In one exemplary embodiment, the logic 404 includes timing logic that is configured to adjust timing for initiating the conversion logic, reception of the first data stream in the first data format, and/or transmission of the converted data stream in the second data format. In one exemplary embodiment, the timing logic determines a first frame timing of an AV data stream in a CSI2 D-PHY data format and a second frame timing of an AV data stream in a DisplayPort data format. Common examples of such timing logic may include logic configured to identify specific control and/or data symbols within the corresponding first or second data stream. Other examples of such timing logic may receive explicit out-of-band communication such as synchronization pulses, frame timing, external clocking and/or other synchronization based logic.

In one such embodiment, the timing logic initiates the format conversion process. The timing logic may have dedicated logic and/or signaling to the conversion logic. In some variants, the timing logic may further adjust various parameters for the conversion logic. In some cases, the dedicated logic and/or signaling may include e.g., level based signaling, edge based signaling, general purpose input output (GPIO), memory mapped configurations, hardware interrupts, message signaled interrupts, packet communication, and/or any other scheme or protocol for providing communication therewith. In some embodiments, the operational memory 406 is structured as a First-In-First-Out (FIFO) buffer to smooth out rate mismatches. In one embodiment, the size of the FIFO buffer is sized according to the largest rate mismatch. In other embodiments, the size of the FIFO is based on one or more of the data types. For example, in some cases, the FIFO may be required to downrate and/or uprate data transmissions so as to correctly bridge between clock rate mismatches and/or media format mismatches (e.g., 720p to 1080p up conversion or down conversion.)

Various other forms of other operational memory 406 and/or memory buffers may be substituted by artisans of ordinary skill in the related arts given the contents of the present disclosure. Common examples of such memory buffers include without limitation e.g., First-In-First-Out (FIFO), Last-In-First-Out (LIFO), ping-pong buffers, round robin buffers, circular buffers, linked list data structures, hash tables, association lists, and/or other memory based data structures.

Artisans of ordinary skill in the related arts will readily appreciate that different data formats may require some manipulation. For example, audio visual content may need to be encrypted/decrypted, scrambled/unscrambled, error-coded/error-corrected, modulated/demodulated, interleaved/deinterleaved, upscaled/downscaled, compressed/decompressed, interpolated/extrapolated, padded/punctured, and/or any number of other processing manipulations. In one exemplary embodiment, row and column pixel values (RGB, YCrCv, etc.) may be compressed into MPEG type data. In some variants, the format conversion may require the removal and/or insertion of different data. For example, horizontal and/or vertical blanking intervals may be removed and/or link training intervals and/or power sequencing can be inserted.

In one exemplary embodiment, the power subsystem 408 is configured to provide power and/or manage power consumption of the bridge device 400. Common examples of power subsystems include without limitation batteries, wall adaptors, and/or other power appliances. In some embodiments, the bridge device 400 may additionally operate in a low power mode when one or more of the I/O 402 are inactive in order to reduce power consumption.

In one exemplary embodiment, the timing logic is configured to minimize the memory buffer footprint (e.g., the amount of content that is buffered in order to ensure seamless conversion) by initializing the first interface ahead of the second interface such that link initialization and wake procedures complete at the same time. Thereafter, conversion can occur with a minimal memory buffering footprint because the data rate into the memory buffer is substantially similar to the data rate out of the memory buffer. In one such variant, the DisplayPort PHY interface is initialized ~600 ns ahead of the CSI2 D-PHY.

More generally, various aspects of the present disclosure minimize reliance on a large memory buffer to absorb time differences between the initialization times associated with different interface technologies. Instead, by aligning initialization times such that the interfaces are initialized from low power modes at approximately the same time, the bridge device can perform "pass-through" conversions of the incoming data streams to outgoing data streams.

As a practical matter, while the memory buffer requirements can be greatly reduced, in some embodiments a small amount of buffer may still be required for ancillary tasks. For example, in some variants, a small buffer can smooth data format and/or protocol differences. For example, the two protocols may have different overhead timings (for e.g., packet headers, footers, and/or other packet formatting markers) or different packing schemes (such as pixel-to-byte conversion). Similarly, there may be some amount of buffering to provide timing margins for start of frame (SOF) timing. For example, the buffer may provide some robustness such that a link is not broken if the prediction of the next SOF timing is incorrect/late. In still other variants, manufacturers may prefer to add more flexibility in the design to e.g., "future proof" and/or enable new functionality down the road (e.g., different PLL, logic timing, etc.)

In still another embodiment, processing complexity may be optimized. For example, certain aspects of format conversion may be handled in software (e.g., a processor core within the FPGA) slower than in dedicated logic (e.g., LUT based hardware logic within the FPGA), software format conversion may be desired for other reasons. For example, the FPGA may be able to support new AV codec formats in software based solutions; additionally, processing cores may require very few routing and/or logic resources. In such embodiments, the amount of delay can be dynamically adjusted based on the conversion logic. For example, if the FPGA uses software processing then the delay can be lengthened because the software takes longer; in contrast, if the FPGA uses dedicated hardware, the device should minimize the delay between the first and second interface.

More generally, artisans of ordinary skill given the contents of the present disclosure will readily appreciate that a variety of different factors can be substituted, combined, and/or hybridized with equivalent skill. Common examples of such considerations include without limitation: processing complexity, interface bandwidth, memory footprint, power consumption, user experience, etc.

Example Operation—

Figure 5:
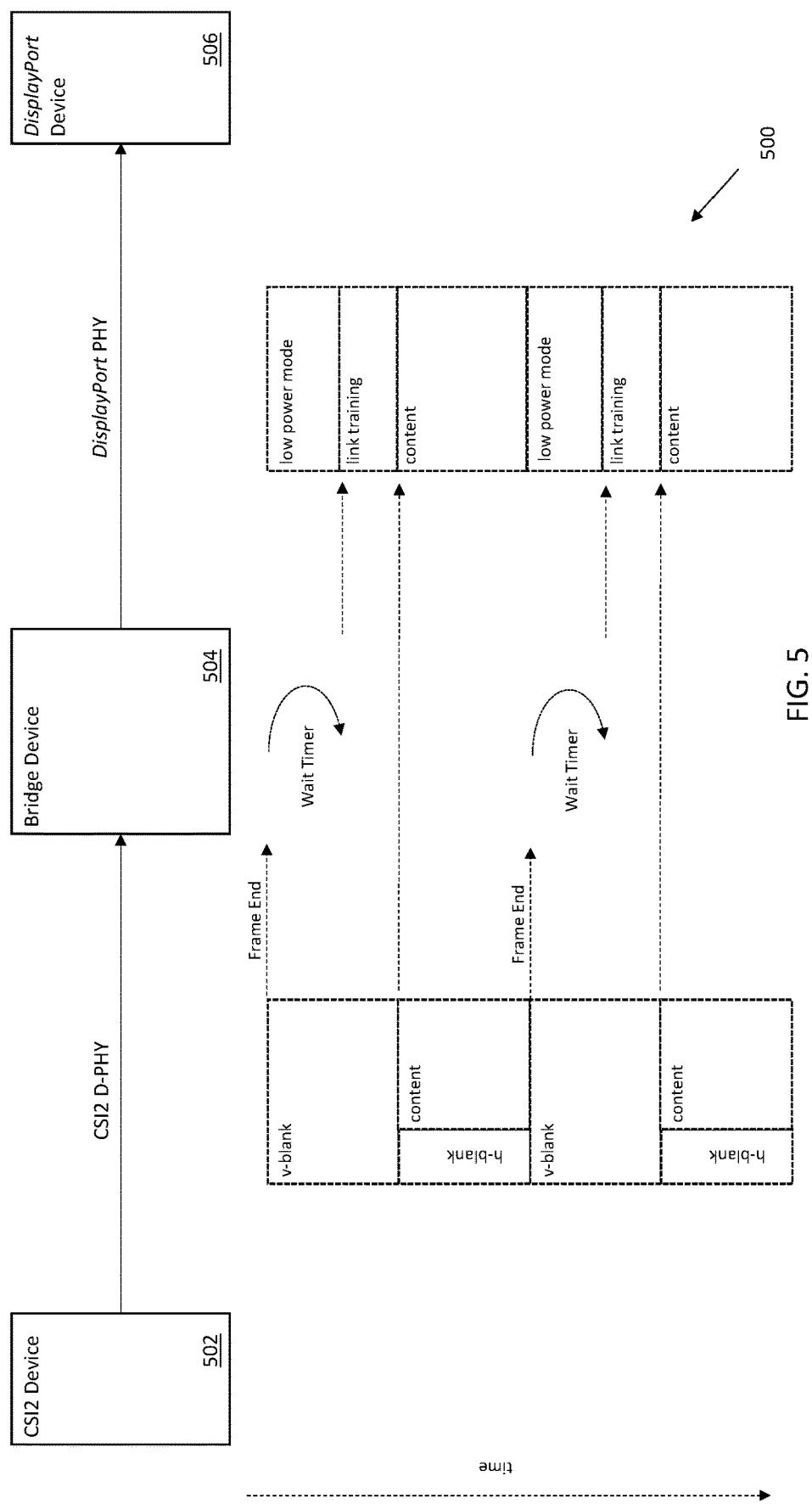
FIG. 5 is a graphical representation of one exemplary bridge network, in accordance with the various principles described herein.

FIG. 5 is a graphical representation of one exemplary bridge network 500 useful to illustrate various aspects of the present disclosure. As shown therein, a CSI2 D-PHY device 502 provides a CSI2 D-PHY data stream to an exemplary bridge device 504; the bridge device 504 converts the CSI2 D-PHY data stream into a DisplayPort data stream for consumption by a DisplayPort device 506.

In FIG. 5, the CSI2 D-PHY and DisplayPort links transition to an inactive mode during the vertical blanking intervals. Similarly, both CSI2 D-PHY and DisplayPort links transition to active modes during content transmission. However, unlike the system 300 of FIG. 3 that starts link initialization for DisplayPort when the CSI2 D-PHY link wakes up, the system 500 of FIG. 5 starts link training based on a wait timer expiration. Specifically, the wait timer expiration is triggered based on the end of the previous frame. More directly, the periodic nature of video frame data enables the bridge device 504 to predict the timing of a subsequent frame based on its prior frame (exceptions to regular frame timing are handled in the discussion of FIG. 6, infra.)

In the illustrated embodiment of FIG. 5, the end of content is demarcated by a frame end signal. Receiving the frame end signal from the CSI2 D-PHY interface starts a wait timer in the bridge device. When the wait timer expires, the bridge device 504 starts link initialization of the DisplayPort link.

The wait timer interval is determined such that the DisplayPort link is fully initialized by the time that the CSI2 D-PHY link has woken up. Thus, as soon as the CSI2 D-PHY link has woken, content can be spooled (with minimal buffering) to the DisplayPort link.

As previously alluded to, there are some circumstances where frame timing changes between frames. Under such circumstances, a new wait timer interval should be determined so as to ensure that the change in timing does not result in e.g., link training while new CSI2 D-PHY data is spooling (which would result in excessive buffering and/or dropped video data).

Figure 6:
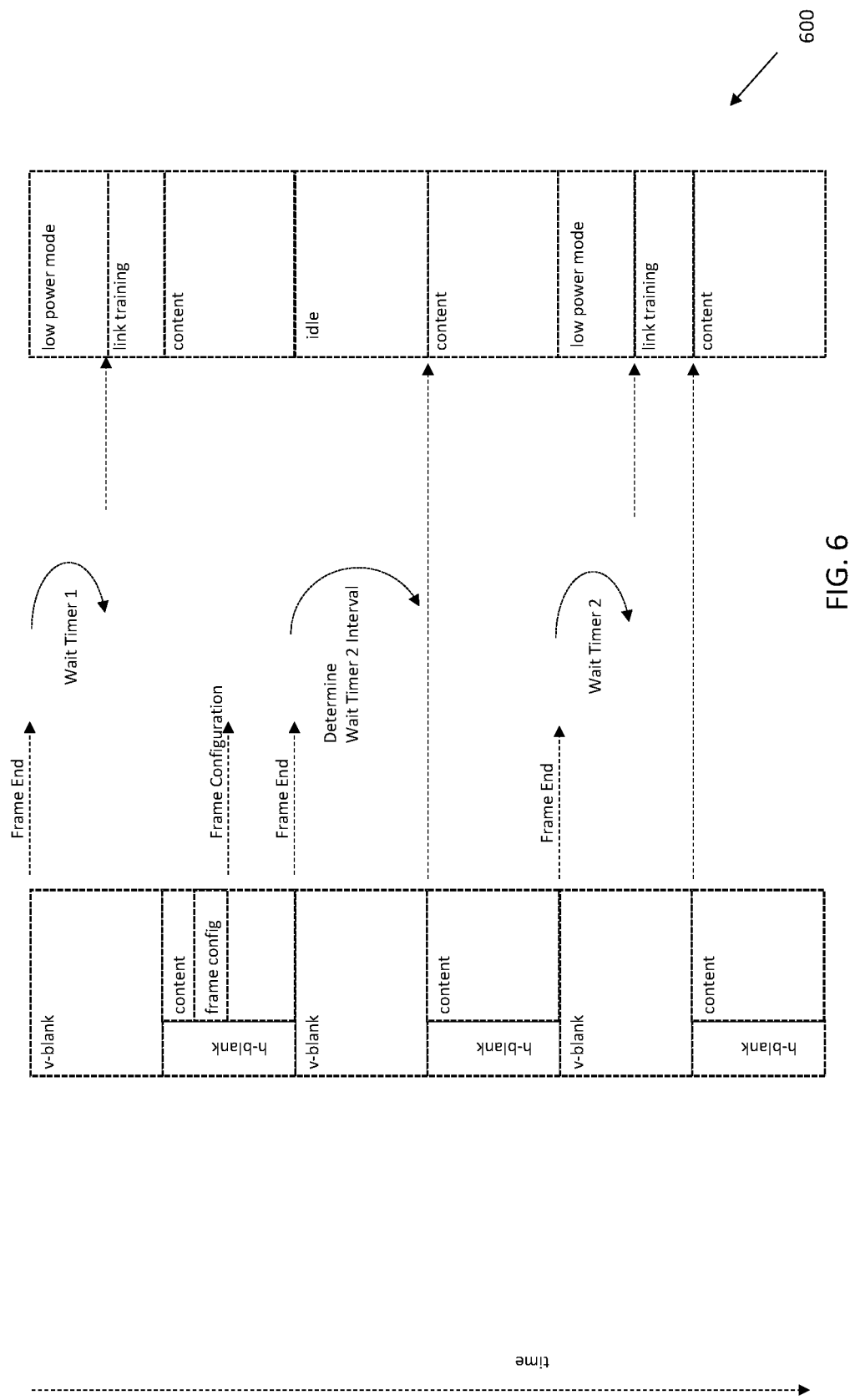
FIG. 6 is a graphical representation of a wait timer determination process triggered by a change to frame timing, in accordance with the various principles described herein.

FIG. 6 is a graphical representation of a wait timer determination process 600 triggered by a change to frame timing, useful to illustrate various aspects of the present disclosure. While FIG. 6 illustrates a wait timer determination process triggered by a change to frame timing, the following procedure is equally applicable to initial operation. More directly, when the link is initially powered up, the first frame of CSI2 D-PHY data also includes frame configuration signaling and such information may be used for wait timer determination.

As shown in FIG. 6, initially a first wait timer operates as previously described (e.g., enabling link training such that the DisplayPort link is fully initialized by the time that the CSI2 D-PHY link has woken up). The CSI2 D-PHY data includes frame configuration signaling. Frame configuration signaling can affect a variety of display options; for example, the video frame may be resized, change resolution, change frame rate, etc. A variety of video frame configurations that may potentially change video frame timing will be readily appreciated by those of ordinary skill in the related arts given the contents of the present disclosure.

Once the bridge device determines that a frame reconfiguration (or the first frame of the initialization sequence) has occurred, the bridge device keeps the DisplayPort link active but idle so as to ensure that the link will be ready for when the CSI2 D-PHY link wakes up. Thus, once the CSI2 D-PHY link wakes up the content can directly be spooled to the DisplayPort link without any data loss.

Even though the DisplayPort link consumes more power while idle than in low power mode, idle operation is preferred where data loss is undesirable. Alternative embodiments may allow the DisplayPort link to enter low power mode if e.g., the data loss is preferred over power consumption. Still other variants that have sufficient processing complexity may be able to predict an appropriate new wait time based on the frame configuration information. Various other techniques may be substituted by artisans of ordinary skill in the related arts given the contents of the present disclosure.

Additionally, responsive to the frame reconfiguration, the bridge device also determines a new wait time interval based on the frame end signaling and the new frame configuration. In some cases, this may be a running internal timer value. In order to determine the new wait time interval, the bridge device determines the total time between the new frame end signaling and the new CSI2 D-PHY frame start signaling. The total determined time less the DisplayPort link initialization time is the new wait time value.

Thereafter, the newly determined second wait time interval can be used for future link initialization timing for DisplayPort low power mode.

Method—

Figure 7:
FIG. 7 is a logical flow diagram of one exemplary method for converting streaming media between different formats within reduced buffering memory.

FIG. 7 is a logical flow diagram of one exemplary method for converting streaming media between different formats within reduced buffering memory.

At step 702 of the method 700, a wait interval is determined. In one exemplary embodiment, the wait interval is determined empirically by measuring an amount of time that elapses e.g., between periodic frame timing signals. For example, in one exemplary embodiment, a wait interval is determined based on the difference in time between a video frame's start frame signal and its immediate predecessor video frame's end frame signal. In other examples, the wait interval may be determined based on a difference in time between a video frame's start frame signal and its immediate predecessor's video frame's start frame signal.

In some applications, the data stream is periodic. Common examples of such data streams include without limitation e.g., streaming media (e.g., audio, video, etc.), time multiplexed data transfers, and any other repetitive data transfer task. Artisans of ordinary skill in the related arts will further appreciate that periodicity within some tolerances can be accommodated with more conservative or less conservative timing. For example, if performance is prioritized over power consumption, then an activity mode "window" can be selected to conservatively encompass a larger window than the data stream periodicity by setting a shorter wait time interval. In contrast, if power consumption is prioritized over performance, then the wait time interval may be set exactly based on periodicity (or perhaps even longer).

In other applications, the data stream is aperiodic but may include predictive triggering signaling. For example, querying a database may be initiated with a query signal over a bus, the bus may enter low power state for a wait interval of time while the query is being processed, and thereafter the bus can resume operation. Other common examples of such aperiodic data streams include without limitation e.g., server fetches, polling, memory searches, and/or other tasks which are initiated by a first signaling and require subsequent non-determinative signaling.

In alternative embodiments, the wait interval is determined via calculation based on one or more parameters. For example, periodic frame timing signals may be sufficiently time accurate that the start frame time can be predicted based on only the start frame signal and a time determined by the periodicity of the video signal (e.g., 24 frames a second corresponds to a total time interval of ~41 ms between start frames). In some variants, the parameters may be selected based on one or more considerations. Common examples of such considerations include without limitation: service quality, power consumption, processing complexity, memory consumption, and/or any number of other system parameters.

In another alternative embodiment, the wait interval is a fixed value that is e.g., hardcoded into a bridge device during manufacture. For example, certain manufacturers create cost efficient bridge solutions by tightly controlling the interfaces that are supported. Minimizing the amount of variance in timing may allow for static parameters that are hardcoded at manufacture; i.e., the bridge device only works with a specific wait time interval. For example, such a fixed dongle may support only CSI2 D-PHY to DisplayPort operation at a specific frame rate, resolution, etc. In a similar embodiment, the wait interval may be selected from a table of multiple different fixed values that are e.g., hardcoded into a bridge device during manufacture. Such embodiments may support various different connectivity modes. For example, CSI2 D-PHY to DisplayPort at a first resolution/frame rate and CSI2 D-PHY to DisplayPort at a second resolution/frame rate, etc.

In one exemplary embodiment, the wait interval is determined during operation based on a reconfiguration signal. In one exemplary embodiment, the wait interval determination is based on a frame configuration signal that is included within the CSI2 D-PHY video frame content. In other embodiments, the wait interval may be determined based on control information provided either in-band (as part of the bus transaction itself) or out-of-band (via a separate bus or other control mechanism).

In still other embodiments, the wait interval may be determined once at initialization (during an initial power-up and/or connection process) and used thereafter.

In yet another embodiment, the host can configure a wait time in advance. In one such implementation, the host may reconfigure a wait time multiple frame cycles in advance. Subsequently thereafter, the newly determined wait time is not implemented until a triggering event occurs that identifies an appropriate time to use the new frame timing (such as embedded data content.) Other techniques for time shifting wait time determinations may be substituted with equivalent success by those of ordinary skill, given the contents of the present disclosure.

Various other techniques for determining a wait interval will be readily appreciated by those of ordinary skill given the contents of the present disclosure.

At step 704 of the method 700, a frame timing signal is detected. In one exemplary embodiment, the frame timing signal is a frame end (FE) signal that identifies the end of active content. In other embodiments, the frame timing signal is a frame start (FS) signal that identifies the start of active content. In still other embodiments, the frame timing signal may be a control signal such as a start blanking (BS) symbol, blanking end (BE) symbol. Various other forms of control signaling may include without limitation: secondary data packets (SDP), SDP start symbols (SS), SDP end symbols (SE), Main Stream Attribute (MSA), Start of Frame (SOF), End of Frame (EOF), Vertical Blanking Identifier (VB-ID), and/or Mvid/Maud (time stamp values). More generally, the frame timing signal may be any signal that provides some indication of a following active mode. Various other substitutions may be made with equivalent effect by those of ordinary skill, given the contents of the present disclosure.

In one exemplary embodiment, a wait interval timer is started responsive to the frame timing signal. In one exemplary embodiment, the wait interval timer may be paused, reset, modified (e.g., incremented or decremented out of sequence) based on one or more further signaling. For example, if a CSI2 D-PHY link is paused, then the corresponding DisplayPort link may similarly be paused. More directly, artisans of ordinary skill will readily appreciate that the wait interval timer may be adjusted to remove the effect of events that affect the transfer rate of content between interfaces.

In another embodiment, a wait interval timer may be started responsive to a line counter that counts the number of image lines for each frame. The number of image lines for each frame may be determined from the frame configuration information. Various other techniques can use other known data markers within the frame; for example, frame starts, frame ends, blanking intervals, etc.

At step 706 of the method 700, a link is initialized after the determined wait interval has expired. In one exemplary embodiment, the bridge device initiates a link training activity for a DisplayPort link. Link initialization may include any time, power, synchronization, and/or clock preparation that must be completed prior to link activation.

In one exemplary embodiment, link training includes clock recovery. In one such implementation, link training includes powering up a phase locked loop (PLL) and allowing the PLL to achieve a steady state clock frequency. In other implementations, link training includes powering up a delay locked loop (DLL) or other PLL/DLL variant. Still other implementations may use crystal oscillators (XO) or other clocking mechanisms. In some instances, clock recovery includes matching a resulting clock (generated by e.g., a PLL) to a data stream and attempting to align the clock to the data stream transmissions. Specifically, clock alignment may include increasing or decreasing the clock frequency such that the resulting clock edge transitions align with (and satisfy the required setup and hold time requirements) of data transitions within a data stream.

In one exemplary embodiment, link training includes symbol lock. More directly, many forms of data streams are not streams of bits, but rather aggregations of binary data values. In order to correctly process the data stream, the receiver has to correctly determine which bits of the bit stream correspond to the start of a symbol. Thereafter the receiver is "symbol locked."

While the foregoing discussion presents link training within the context of clock recovery and symbol lock, various other bus technologies may include different forms of link initialization. For example, link initialization may include network discovery, bus enumeration, bus arbitration, and/or any number of other data access techniques to enable bus activity.

More generally, while the aforementioned disclosure is directed to analog considerations of link training, artisans of ordinary skill in the related arts will readily appreciate that the various concepts described herein are not so limited and may also apply to digital communications which may be required prior to link operation and/or any number of other link overhead procedures. Common examples include protocol overhead such as in-band, out-of-band, and/or sideband communication. Such protocols may include transfers of e.g., control information, version information, identification, enumeration, authentication, and/or any number of other such communications.

At step 708 of the method 700, content is transferred from a first interface to a second interface when both interfaces are active. In one exemplary embodiment, the transfer of content from a first interface is performed in a FIFO. In particular the size of the FIFO may be selected so as to minimally accommodate any rate mismatches and/or intermittent connection interruptions. However, unlike prior art solutions, the FIFO structure enabled by the present disclosure need not be sized sufficient to accommodate data accumulated during link initialization (which is orders of magnitude larger than either rate mismatch issues or intermittency). In other words, the FIFO can be greatly reduced in size.

In one exemplary embodiment, the step 708 of the method 700 further includes a conversion from one media format to another media format. In one exemplary embodiment, the conversion is from one video and/or audio format to another video and/or audio format. For example, in one such variant the conversion is from a CSI2 D-PHY format to a DisplayPort format. In other embodiments, the conversion is from one stream format to another stream format.

In one exemplary embodiment, the step 708 of the method 700 further includes the addition, deletion or modification of one or more elements of content. Common examples of modification include e.g., uprating, downrating, transrating, re-scaling, re-clocking, up-clocking, down-clocking, re-encoding, transcoding, and/or any other bridging operation. For example, in one exemplary embodiment, the bridge device may upconvert a 720p CSI2 D-PHY video frame to a 1080p DisplayPort video frame via common techniques for upconversion (e.g., video line duplication, etc.) Still other modifications will be readily appreciated by those of ordinary skill in the related arts, given the contents of the present disclosure.

At step 710 of the method 700, the bridge device transitions one or both of the interfaces to a low power mode. In some embodiments, the bridge device may actively transition one or both interfaces to a low power mode. In other embodiments, the interfacing devices may independently enter low power modes.

In some embodiments, the bridge device itself may transition to a low power mode during inactivity. In other embodiments, the bridge device may remain active despite its other connected devices being inactive. In still other embodiments, the bridge device may be instructed by one or both of its connected devices to enter low power mode.

In one embodiment, the bridge device returns to step 702 for the next frame in order to determine the next wait interval. For example, as previously alluded to, the wait interval may be determined based on a reconfiguration signal (e.g., a frame configuration signal that is included within the CSI2 D-PHY video frame content). In other examples, changes to the wait interval may be determined based on control information provided within the content itself (e.g., in-band or out-of-band).

In alternative embodiments, the bridge device uses a previously determined wait time interval information. For example, once the content has been successfully transferred the frame end signal starts the timer with the previously determined wait time interval information (see e.g., step 704 described supra).

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for converting streaming media between different formats, comprising:
   determining a wait interval, the wait interval comprising a timing difference between a first signal in a first media format and a second signal in a second media format, the first signal corresponding to an end portion of an active period associated with at least a portion of the streaming media, the second signal corresponding to a start portion of the active portion;
   starting a timer for the wait interval in response to detecting said end portion or said start portion;
   initiating link training after the timer has expired; and
   transferring content.

2. The method of claim 1, wherein the wait interval is determined based on a time difference between a first video frame and an immediate predecessor video frame.

3. The method of claim 1, wherein the wait interval is determined based on a time difference between a first video start frame signal and a second video start frame signal.

4. The method of claim 1, wherein the wait interval is determined based on a time difference between a first video start frame signal and a second video end frame signal.

5. The method of claim 1, wherein the wait interval is determined based on one or more parameters associated with a video frame configuration.

6. The method of claim 5, wherein the one or more parameters comprises a frame rate.

7. The method of claim 5, wherein the one or more parameters comprises a vertical blanking interval time.

8. The method of claim 1, wherein the transferring the content further comprises:
   receiving a first data stream into a memory buffer;
   converting the first data stream into a second data stream; and
   transmitting the second data stream.

9. A bridge apparatus, comprising:
   a first interface configured to receive a first data stream having a first data format;
   a second interface configured to transmit a second data stream having a second data format different than the first data format;
   wherein the first interface has a first initialization time and the second interface has a second initialization time;
   a processing logic comprising a conversion logic and a timing logic:
   the conversion logic configured to convert the first data stream having the first data format into the second data stream having the second data format; and
   the timing logic configured to initialize the first interface or the second interface based on a difference between the first initialization time and the second initialization time.

10. The bridge apparatus of claim 9, wherein the first interface is a Camera Serial Interface 2 (CSI2)-compliant interface and the second interface is a DisplayPort-compliant interface.

11. The bridge apparatus of claim 9, wherein the first interface is configured to receive an external clock signal; and
   wherein the second interface comprises a clock recovery circuit.

12. The bridge apparatus of claim 11, wherein the first initialization time is based on a settling time associated with the external clock signal.

13. The bridge apparatus of claim 11, wherein the second initialization time is based on a clock recovery time and a symbol lock time associated with the clock recovery circuit.

14. The bridge apparatus of claim 9, further comprising a memory buffer configured to store an amount of data; and
   wherein the amount of data is based on a first data rate of the first data stream and the difference between the first initialization time and the second initialization time.

15. The bridge apparatus of claim 14, wherein the timing logic is further configured to calculate the amount of data based on a frame configuration parameter.

16. The bridge apparatus of claim 9, wherein the timing logic is further configured to measure a time that elapses between periodic frame timing signals; and wherein the bridge apparatus further comprises a memory buffer configured to store an amount of data based on the time.

17. The bridge apparatus of claim 16, wherein the timing logic measures the time that elapses between periodic frame timing signals in response to a frame configuration.

18. The bridge apparatus of claim 16, wherein the timing logic measures the time that elapses between periodic frame timing signals in response to an initial power-up process.

19. A consumer device, comprising:

a memory component configured to store data;

bridge logic configured to receive a first data stream having a first data format and generate a second data stream having a second data format different than the first data format;

wherein an initialization period associated with receipt of the first data stream requires a different amount of time than an initialization period associated with generation of the second data stream; and wherein the bridge logic consumes an amount of memory of the memory component based on a buffering time, the buffering time being configured to enable a temporal offset of the initialization period associated with the generation of the second data stream; and a timing logic configured to adjust the amount of memory consumed.

20. The consumer device of claim 19, wherein the consumer device further comprises:

a camera component configured to generate the first data stream according to a Camera Serial Interface 2 (CSI2) data format; and an audio visual component configured to receive the second data stream according to a DisplayPort data format.

* * * * *